(No Model.)
E. B. WINTERS.
WAGON SEAT.
No. 534,937. Patented Feb. 26, 1895.
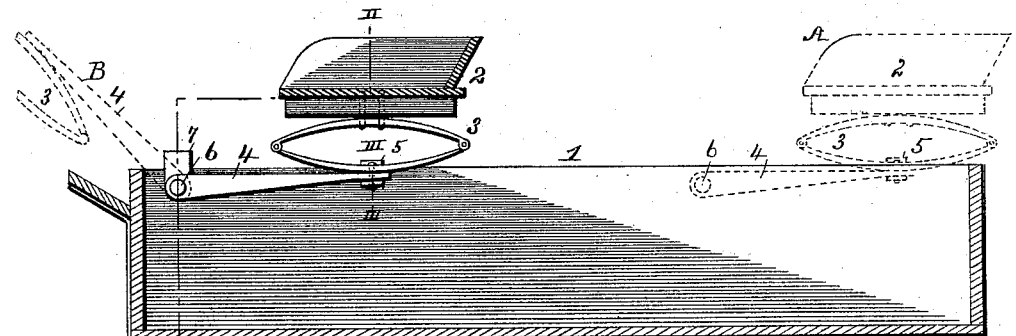
*Fig. I.*
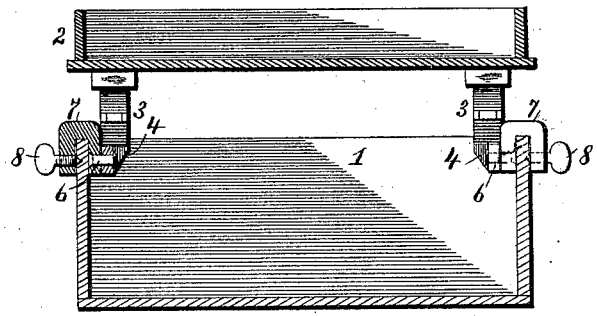
*Fig. II.*
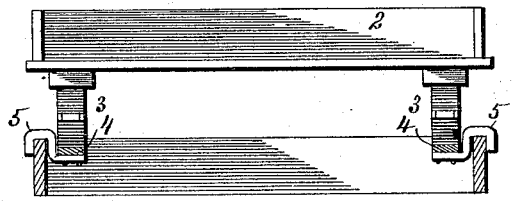
*Fig. III.*
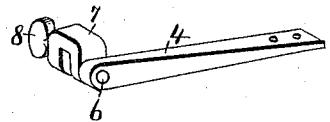
*Fig. IV.*
Witnesses:
F. G. Fischer
Marvin Minnear
Inventor:
E. B. Winters.
By Knight Bros.
Attys.

UNITED STATES PATENT OFFICE.

EDWARD B. WINTERS, OF COFFEYVILLE, KANSAS, ASSIGNOR, BY DIRECT AND MESNE ASSIGNMENTS, OF ONE-HALF TO FRANK DAY AND M. F. H. DAY, OF SAME PLACE.

WAGON-SEAT.

SPECIFICATION forming part of Letters Patent No. 534,937, dated February 26, 1895.

Application filed May 29, 1894. Serial No. 512,892. (No model.)

*To all whom it may concern:*

Be it known that I, EDWARD B. WINTERS, of Coffeyville, in the county of Montgomery and State of Kansas, have invented certain new and useful Improvements in Wagon-Seats, of which the following is a full, clear, and exact description, reference being had to the accompanying drawings, which form a part of this specification.

My invention relates to certain new and useful improvements in wagon-seats adapted to be removably attached to the wagon body and to fold over out of the way of the driver in unloading from the body; and my invention consists in certain features of novelty hereinafter described and pointed out in the claims.

Figure I,—represents a wagon body with my improved wagon seat thereon. Fig. II,—represents an end view of the same. Fig. III,—represents a cross section of the same. Fig. IV,—is a detailed perspective of the front saddle and arm by which the seat is carried on the body.

Similar numerals refer to similar parts throughout the several views.

1,— represents a wagon-body.

2,— is a seat supported on the springs 3 carried on the arms 4 supported by rear saddles 5 and pivoted at 6 upon the front saddle 7 by which the wagon seat is carried on the body.

8,— represents thumb-screws passing through the front saddles and engaging the sides of the body and by which they are retained after adjustment thereon. The seat is adjustable on the body and may be moved back and forth and fixed in any position as shown by the dotted lines at A. The arms which carry the seat being pivoted to the front saddles may be folded or thrown forward out of the way in unloading the body as shown by the dotted lines at B.

Having thus fully described my improvements, what I claim as my invention, and desire to secure by Letters Patent, is—

1. The combination with a wagon-body and a seat, of the front and rear saddles, for supporting the seat adapted to be moved back and forth along the sides of the body and arms pivoted to one pair of the saddles and secured to the other pair of saddles.

2. The combination with a wagon-body of the front saddles 7 and the rear saddles 5 adapted to be moved back and forth upon the sides of the body and the arms 4 pivoted to the front saddles and secured to the rear saddles, substantially as described.

EDWARD B. WINTERS.

Witnesses:
C. M. BALL,
H. H. MATHONET.